(12) United States Patent
Park et al.

(10) Patent No.: US 6,749,895 B2
(45) Date of Patent: Jun. 15, 2004

(54) POLYMER FOR PREPARING LIQUID CRYSTAL ALIGNMENT LAYER

(75) Inventors: Jung-Ki Park, Taejon (KR); Shi-joon Sung, Taejon (KR); Jong-Woo Lee, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 52 days.

(21) Appl. No.: 10/094,897

(22) Filed: Mar. 8, 2002

(65) Prior Publication Data

US 2002/0198358 A1 Dec. 26, 2002

(30) Foreign Application Priority Data

Mar. 9, 2001 (KR) .............................. 10-2001-0012152

(51) Int. Cl.[7] .............................. B05D 5/12; C08L 79/08
(52) U.S. Cl. .............................. 427/335; 216/23; 428/1; 428/473.5; 524/538; 525/436
(58) Field of Search ..................... 525/436; 524/538; 428/1, 473.5; 216/23; 427/335

(56) References Cited

U.S. PATENT DOCUMENTS 6,066,696 A * 5/2000 Yu et al. ..................... 525/178
6,107,427 A   8/2000 Herr et al. .................. 526/321
6,307,002 B1 * 10/2001 Okada et al. ................ 528/170

OTHER PUBLICATIONS

Masaki Obi et al., Factors Affecting Photoalignment of Liquid Crystals Induced by Polymethacrylates with Chains., 1999, 11.656–664.

* cited by examiner

*Primary Examiner*—Ana Woodward
(74) *Attorney, Agent, or Firm*—Knobbe Marten Olson & Bear LLP

(57) ABSTRACT

The present invention provides a polymer in which coumarin, a photo-reactive molecule, is grafted onto a polyimide for preparing liquid crystal alignment layer which has a superior alignment property and an excellent thermal stability in photo-alignment, a process for preparing the said grafted polymer, a process for preparing liquid crystal alignment layer by employing the said grafted polymer, and a liquid crystal alignment layer prepared by the process. The polymer of the invention is prepared by mixing a coumarin compound with a polyimide, dissolving the mixture in an organic solvent, adding a catalyst, and stirring under an environment of $N_2$ gas. The polymer of the invention is superior in terms of the thermal stability, which makes possible its universal application for the development of a novel liquid crystal display(LCD).

25 Claims, No Drawings

POLYMER FOR PREPARING LIQUID CRYSTAL ALIGNMENT LAYER

BACKGROUND OF THE INVENTION

1. Field of the Invention

The present invention relates to a polymer for preparing liquid crystal alignment layer, more specifically, to a polymer in which coumarin, a photo-reactive molecule, is grafted onto a polyimide for preparing liquid crystal alignment layer which has a superior alignment property and an excellent thermal stability in photo-alignment, a process for preparing the said grafted polymer, a process for preparing liquid crystal alignment layer by employing the said grafted polymer, and a liquid crystal alignment layer prepared by the process.

2. Description of Related Technology

Liquid crystal displays("LCDs") have been widely used in laptop computers and car navigation systems, since they are light and small compared to the conventional cathode ray tubes. Further, the recent increased demand for large monitors as well as the advantages of the lightness and thinness of liquid crystal displays leads the use of LCD to desktop monitors.

Most LCDs are thin film transistor-liquid crystal displays (TFT-LCD), in which the light from a fluorescence lamp is incident on a liquid crystal panel by a reflection or dispersion device, and the incident ray is passed through or intercepted by the liquid crystal layer, of which birefringence is changed depending on the voltage controlled by the thin film transistor(TFT) to display an image. The liquid crystal panel consists of two glass plates filled with twisted nematic liquid crystals between the plates: One glass plate upon which the light is incident, comprises a thin film transistor, pixel made of indium tin oxide(ITO) and a liquid crystal alignment layer, while the other glass plate is equipped with a color filter and coated with a liquid crystal alignment layer. A polarizer is attached to the outside of both of the two glass plates. The liquid crystal alignment layer with liquid crystals is aligned in a parallel and perpendicular manner against the surface of the plate, where the liquid crystals are mechanically contacted by a rubbing method using a soft cotton or nylon velvet to a plate coated with polymers. However, the liquid crystal alignment by the rubbing method is less satisfactory in the senses of a breakage of thin film transistor, a cross-track-short due to static charge build-up and an increase of inferior quality products caused by a dust.

To overcome these shortcomings of the rubbing method, several non-contact methods for aligning liquid crystals have been studied. Among the methods, a photo-alignment method that aligns liquid crystals by means of photo irradiation to prepare a liquid crystal alignment layer, employs polymers aligning liquid crystals by means of photo-dimerization, photo-isomerization and photodecomposition, respectively. However, the polymers have revealed defects such that they require a long period of photoirradiation due to a slow photoreaction or bring a low pretilt angle so the polymers are not practically employed and manufactured into a liquid crystal alignment layer.

Under the circumstances, there are strong reasons for exploring and developing an alternative polymer which can overcome the said problems for preparing a liquid crystal alignment layer.

SUMMARY OF THE INVENTION

The present inventors have made an effort to develop a novel polymer to overcome the defects of the conventional polymers employed for a photo-alignment method, and grafted a coumarin compound which exhibits a superior alignment property even by short photo irradiation onto a polyimide possessing an excellent thermal stability to prepare a polymer, and found that a liquid crystal alignment layer prepared by employing the said polymer has superior alignment property and thermal stability.

The first object of the present invention is, therefore, to provide a polymer in which a coumarin compound is grafted onto a polyimide for preparing liquid crystal alignment layer. The second object of the invention is to provide a process for preparing the said grafted polymer. The third object of the invention is to provide a process for preparing liquid crystal alignment layer by employing the said grafted polymer. The fourth object of the invention is to provide a liquid crystal alignment layer prepared by the said process.

One aspect of the present invention provides a polymer comprising a polyimide backbone and a coumarin grafted onto the backbone. The polymer has a molecular weight from 10 to 300 kDa. The coumarin is one or more selected from the group consisting of 7-hydroxycoumarin, 7-(2-hydroxyethoxy)coumarin, 7-(6-hydroxyhexyloxy)coumarin, and compounds represented as a general formula (I):

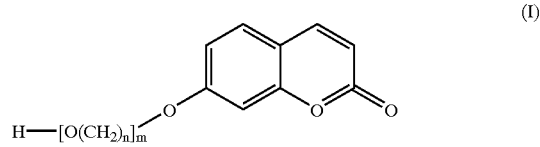

wherein m is an integer of 0 to 3, and n is an integer of 0 to 10. The polyimide is one or more selected from the group consisting of poly(4,4'-(hexafluoroisopropylidene)diphthalic anhydride-3,5-diaminobenzoic acid), poly(pyromellitic dianhydride-3,5-diaminobenzoic acid), poly(1,2,3,4-cyclobutane tetracarboxylic acid-3,5-diaminobenzoic acid), poly(2,2-bis(3,4-dicarboxylphenyl)hexafluoropropane dianhydride-3,5-diaminobenzoic acid), poly(pyromellitic dianhydride-4,4'-oxydiamine), poly(pyromellitic dianhydride-2,2-bis[4-(4-aminophenoxy)phenyl]-hexafluoropropane), poly(pyromellitic dianhydride-2,2-bis(4-aminophenoxyphenyl)propane), poly(1,2,3,4-cyclobutane tetracarboxylic acid-4,4'-oxydiamine), poly(1,2,3,4-cyclobutane tetracarboxylic acid-2,2-bis[4-(4-aminophenoxy)phenyl]-hexafluoropropane), poly(1,2,3,4-cyclobutane tetracarboxylic acid-2,2-bis(4-aminophenoxyphenyl)propane), poly(2,2-bis(3,4-dicarboxylphenyl)hexafluoropropane dianhydride-4,4'-oxydiamine), poly(2,2-bis(3,4-dicarboxylphenyl)hexafluoropropane dianhydride-2,2-bis[4-(4-aminophenoxy)phenyl]-hexafluoropropane), and poly(2,2-bis(3,4-dicarboxylphenyl)hexafluoropropane dianhydride-2,2-bis(4-aminophenoxyphenyl)propane). A graft ratio of the polymer is from 30 to 100%.

Another aspect of the present invention provides a device for use in a liquid crystal panel comprising: a transparent plate having a surface, and a layer of the above-discussed polymer on the surface.

Another aspect of the present invention provides a liquid composition for use in manufacturing a liquid crystal alignment layer, the liquid composition comprising an organic solution and the above-discussed polymer dissolved in the organic solution. The organic solution comprises N-methyl- 2-pyrrolidone. The polymer is dissolved at a concentration from 1 to 5% (w/w).

A further aspect of the present invention provides a process for preparing a polymer, which comprises a polyimide backbone and a coumarin grafted onto the backbone, the process comprising: mixing a coumarin compound with a polyimide to provide a mixture; dissolving the mixture in a solvent to provide a liquid mixture; and stirring the liquid mixture so as to produce a polyimide grafted with the coumarin. The coumarin compound is selected from the group consisting of 7-hydroxycoumarin, 7-(2-hydroxyethoxy)coumarin, 7-(6-hydroxyhexyloxy) coumarin, compounds represented as a general formula (I), and mixtures thereof:

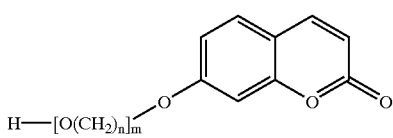

(I)

wherein m is an integer of 0 to 3, and n is an integer of 0 to 10. The polyimide is one or more selected from the group consisting of poly(4,4'-(hexafluoroisopropylidene)diphthalic anhydride-3,5-diaminobenzoic acid), poly(pyromellitic dianhydride-3,5-diaminobenzoic acid), poly(1,2,3,4-cyclobutane tetracarboxylic acid-3,5-diaminobenzoic acid), poly(2, 2-bis(3,4-dicarboxylphenyl)hexafluoropropane dianhydride-3,5-diaminobenzoic acid), poly (pyromellitic dianhydride-4,4'-oxydiamine), poly (pyromellitic dianhydride-2,2-bis[4-(4-aminophenoxy) phenyl]-hexafluoropropane), poly(pyromellitic dianhydride-2,2-bis(4-aminophenoxyphenyl)propane), poly(1,2,3,4-cyclobutane tetracarboxylic acid-4,4'-oxydiamine), poly(1,2,3,4-cyclobutane tetracarboxylic acid-2,2-bis[4-(4-aminophenoxy)phenyl]-hexafluoropropane), poly(1,2,3,4-cyclobutane tetracarboxylic acid-2,2-bis(4-aminophenoxyphenyl)propane), poly(2,2-bis(3,4-dicarboxylphenyl)hexafluoropropane dianhydride-4,4'-oxydiamine), poly(2,2-bis(3,4-dicarboxylphenyl)hexafluoropropane dianhydride-2,2-bis[4-(4-aminophenoxy)phenyl]-hexafluoropropane), and poly(2,2-bis(3,4-dicarboxylphenyl) hexafluoropropane dianhydride-2,2-bis(4-aminophenoxyphenyl)propane). The polyimide has a molecular weight from 10 to 300 kDa. The solvent is dimethylsulfoxide (DMSO). The process further comprises adding a catalyst to the liquid mixture. The catalyst comprises thionyl chloride. The coumarin and polyimide are mixed at a weight ratio of from 0.3:2 to 1:2. The stirring continues for 3 to 5 hours under an environment of $N_2$ gas. The stirring is conducted at a temperature of 50 to 70° C.

A further aspect of the present invention provides a grafted polymer prepared by the above-discussed process. The coumarin compound is grafted by a graft ratio of 30 to 100%.

A still further aspect of the present invention provides a process for preparing a liquid crystal alignment layer, comprising: dissolving the polymer prepared by the above-discussed process in a solvent to provide a polymer solution; coating the solution onto a transparent plate; and evaporating the solvent from the solution, thereby providing a liquid crystal alignment layer. The solvent comprises N-methyl-2-pyrrolidone. The concentration of the grafted polymer in the polymer solution is from 1 to 5% (w/w). A still further aspect of the present invention provides a liquid crystal alignment layer prepared by the process.

DETAILED DESCRIPTION OF THE INVENTION

The polymer of the present invention is prepared by a process in which a coumarin compound is grafted onto a polyimide, prepared by mixing the coumarin compound with the polyimide at a weight ratio ranging from 0.3:2 to 1:2, dissolving the mixture in an organic solvent, adding a catalyst, and stirring at a temperature of 50 to 70° C. for 3 to 5 hours under an environment of $N_2$ gas. The organic solvent and the catalyst preferably include dimethylsulfoxide(DMSO) and thionyl chloride, respectively, and the graft ratio ranges from 30 to 100%. The coumarin compound includes 7-hydroxycoumarin, 7-(2-hydroxyethoxy)coumarin, 7-(6-hydroxyhexyloxy) coumarin, a compound of the following general formula(I) or a mixture thereofs, preferably, 7-hydroxycoumarin:

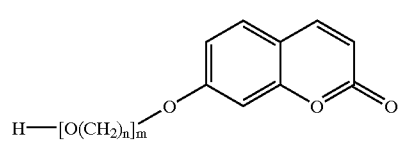

(I)

wherein,
m is an integer of 0 to 3; and,
n is an integer of 0 to 10.

Meanwhile, the polyimide includes poly(4,4'-(hexafluoroisopropylidene)diphthalic anhydride-3,5-diaminobenzoic acid), poly(pyromellitic dianhydride-3,5-diaminobenzoic acid), poly(1,2,3,4-cyclobutane tetracarboxylic acid-3,5-diaminobenzoic acid), poly(2,2-bis(3,4-dicarboxylphenyl)hexafluoropropane dianhydride-3,5-diaminobenzoic acid), poly(pyromellitic dianhydride-4,4'-oxydiamine), a poly(pyromellitic dianhydride-2,2-bis[4-(4-aminophenoxy)phenyl]-hexafluoropropane), poly (pyromellitic dianhydride-2,2-bis(4-aminophenoxyphenyl) propane), poly(1,2,3,4-cyclobutane tetracarboxylic acid-4, 4'-oxydiamine), poly(1,2,3,4-cyclobutane tetracarboxylic acid-2,2-bis[4-(4-aminophenoxy)phenyl]-hexafluoropropane), poly(1,2,3,4-cyclobutane tetracarboxylic acid-2,2-bis(4-aminophenoxyphenyl)propane), poly(2,2-bis(3,4-dicarboxylphenyl)hexafluoropropane dianhydride-4, 4'-oxydiamine), poly(2,2-bis(3,4-dicarboxylphenyl) hexafluoropropane dianhydride-2,2-bis[4-(4-aminophenoxy)phenyl]-hexafluoropropane) or poly(2,2-bis (3,4-dicarboxylphenyl)hexafluoropropane dianhydride-2,2-bis(4-aminophenoxyphenyl)propane) of which molecular weight is 10 to 300 kDa, most preferably, poly(4,4'-(hexafluoroisopropylidene)diphthalic anhydride-3,5-diaminobenzoic acid).

The process for preparing a liquid crystal alignment layer by employing the said polymer in which a coumarin compound is grafted onto a polyimide comprises the steps of dissolving the grafted polymer in an organic solvent, spin-coating the solution onto a glass plate, and evaporating the solvent: wherein, the organic solvent preferably includes N-methyl-2-pyrrolidone and the concentration of the grafted polymer is preferably 1 to 5% (w/w).

The present invention is further illustrated by the following examples, which should not be taken to limit the scope of the invention.

EXAMPLE 1

Comparison of Order Parameters of Liquid Crystal Cells Depending on the Graft Ratio of Coumarin 7-Hydroxycoumarin was grafted onto poly(4,4'-(hexafluoroisopropylidene)diphthalic anhydride-3,5- diaminobenzoic acid)(6FDA-DBA) by a graft ratio of 0, 30 and 50% to prepare a polymer for preparing liquid crystal alignment layer. That is, a graft reaction was carried out by condensing —COOH group of 6FDA-DBA and —OH group of 7-hydroxycoumarin by the catalysis of thionyl chloride and, the graft ratio was calculated by the molar ratio of the grafted coumarin to —COOH group of 6FDA-DBA. Then, the polymer for preparing liquid crystal alignment layer thus prepared was dissolved in N-methyl-2-pyrrolidone in the ratio of 2% (w/w), which was then spin-coated onto a glass plate. The solvent was evaporated to prepare a liquid crystal alignment layer. The liquid crystal alignment layer was irradiated with ultraviolet rays to be photo-aligned, and Liquid crystal was poured between two sheets of the alignment layers to prepare a liquid crystal cell, of which order parameter was then measured (see: Table 1).

TABLE 1

Comparison of order parameters of liquid crystal cells depending on the graft ratio of coumarin

| The graft ratio (%) | 0 | 30 | 50 |
|---|---|---|---|
| order parameter | 0.00 | 0.13 | 0.21 |

As shown in Table 1 above, it was clearly demonstrated that: the polyimide alignment layer in which no coumarin is grafted showed a very low order parameter, indicating that liquid crystal alignment nearly arises only by irradiation of ultraviolet rays; and, the order parameter is increased as the graft ratio is increased. That is, liquid crystal alignment is performed by the grafted coumarin in case of irradiating ultraviolet rays on liquid crystal alignment layer.

EXAMPLE 2

Thermal Stability of the Polymer in which Coumarin is Grafted onto Polyimide

Order parameters of liquid crystal cells were measured in a similar manner as in Example 1, except that: the graft ratios of 7-hydroxycoumarin to 6FDA-DBA were 30% and 50%; and, the grafted polymers were heat-treated at 65, 150 and 200° C.

Comparative Example 1

Thermal Stability of the Polymer in which Coumarin is Grafted onto Polymethylmethacrylate Order parameters of liquid crystal cells were measured in a similar manner as in Example 1, except that: 6FDA-DBA was substituted by polymethylmethacrylate; the graft ratio of 7-hydroxycoumarin to polymethylmethacrylate was 100%; and, the grafted polymers were heat-treated at 65, 150 and 200° C., and then, the result was compared with that of Example 2(see: Table 2).

TABLE 2

Comparison of thermal stability

| Temperature of heat-treatment(° C.) | 6FDA-DBA 30% | 6FDA-DBA 50% | Polymethylmethacrylate 100% |
|---|---|---|---|
| 65 | 0.13 | 0.21 | 0.32 |
| 150 | 0.12 | 0.21 | 0.22 |
| 200 | 0.12 | 0.20 | 0.07 |

As shown in Table 2 above, it was clearly demonstrated that: Though the coumarin-grafted polymethylmethacrylate polymer showed higher order parameter than the coumarin-grafted polyimide, the order parameter was reduced rapidly when increasing the temperature of heat-treatment, proving that the coumarin-grafted polymethylmethacrylate polymer has a low thermal stability. In case of coumarin-grafted polyimide, on the contrary, the order parameter was not changed even in the heat-treatment at a high temperature.

As clearly described and demonstrated above, the present invention provides a polymer in which coumarin, a photoreactive molecule, is grafted onto a polyimide for preparing liquid crystal alignment layer which has a superior alignment property and an excellent thermal stability in photo-alignment, a process for preparing the said grafted polymer, a process for preparing liquid crystal alignment layer by employing the said grafted polymer, and a liquid crystal alignment layer prepared by the process. The polymer of the invention is prepared by mixing a coumarin compound with a polyimide, dissolving the mixture in an organic solvent, adding a catalyst, and stirring under an environment of $N_2$ gas. The polymer of the invention is superior in terms of the thermal stability, which makes possible its universal application for the development of a novel liquid crystal display (LCD).

What is claimed is:

1. A polymer comprising a polyimide backbone and a coumarin moiety grafted onto the backbone, wherein the coumarin moiety grafted onto the backbone is represented by formula (II):

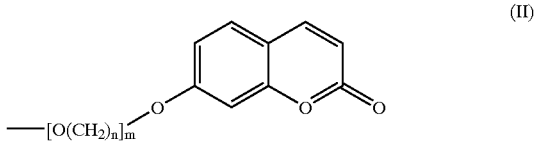

(II)

wherein m is an integer of 0 to 3, wherein n is an integer of 0 to 10, and wherein when m is other than zero, then n is other than zero.

2. The polymer of claim 1, wherein the polymer has a molecular weight from 10 to 300 kDa.

3. The polymer of claim 1, wherein the coumarin moiety is derived from one or more selected from the group consisting of 7-hydroxycoumarin, 7-(2-hydroxyethoxy)coumarin, and 7-(6-hydroxyhexyloxy)coumarin.

4. The polymer of claim 1, wherein the polyimide for backbone is one or more selected from the group consisting of poly(4,4'-(hexafluoroisopropylidene)diphthalic anhydride-3,5-diaminobenzoic acid), poly(pyromellitic dianhydride-3,5-diaminobenzoic acid), poly(1,2,3,4-cyclobutane tetracarboxylic acid-3,5-diaminobenzoic acid), poly(2,2-bis(3,4-dicarboxylphenyl)hexafluoropropane dianhydride-3,5-diaminobenzoic acid), poly(pyromellitic dianhydride-4,4'-oxydiamine), poly(pyromellitic dianhydride-2,2-bis[4-(4-aminophenoxy)phenyl]-hexafluoropropane), poly(pyromellitic dianhydride-2,2-bis(4-aminophenoxyphenyl)propane), poly(1,2,3,4-cyclobutane tetracarboxylic acid-4,4'-oxydiamine), poly(1,2,3,4-cyclobutane tetracarboxylic acid-2,2-bis[4-(4-aminophenoxy)phenyl]-hexafluoropropane), poly(1,2,3,4-cyclobutane tetracarboxylic acid-2,2-bis(4-aminophenoxyphenyl)propane), poly(2,2-bis(3,4-dicarboxylphenyl)hexafluoropropane dianhydride-4,4'-oxydiamine), poly(2,2-bis(3,4-dicarboxylphenyl)hexafluoropropane dianhydride-2,2-bis[4-(4-aminophenoxy)phenyl]-hexafluoropropane), and poly(2,2-bis(3,4-dicarboxylphenyl)hexafluoropropane dianhydride-2,2-bis(4-aminophenoxyphenyl)propane).

5. The polymer of claim 1, wherein a graft ratio of the grafted coumarin moiety to the polyimide backbone is from 30 to 100%.

6. A device for use in a liquid crystal panel comprising:
a transparent plate having a surface, and
a layer of the polymer of claim 1 on the surface.

7. A liquid composition for use in manufacturing a liquid crystal alignment layer, the liquid composition comprising an organic solvent and the polymer of claim 1 dissolved in the organic solvent.

8. The liquid composition of claim 7, wherein the organic solvent comprises N-methyl-2-pyrrolidone.

9. The liquid composition of claim 7, wherein the polymer is dissolved at a concentration from 1 to 5% (w/w).

10. A process for preparing a polymer, which comprises a polyimide backbone and a coumarin moiety grafted onto the backbone, the process comprising:
mixing a coumarin compound with a polyimide to provide a mixture, wherein the coumarin compound is represented by formula (I):

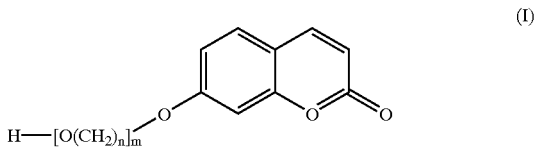

(I)

wherein m is an integer of 0 to 3, wherein n is an integer of 0 to 10, and wherein when m is other than zero, then n is other than zero;
dissolving the mixture in a solvent to provide a liquid mixture; and
stirring the liquid mixture so as to produce a polyimide grafted with coumarin moiety.

11. The process of claim 10, wherein the coumarin compound is selected from the group consisting of 7-hydroxycoumarin, 7-(2-hydroxyethoxy)coumarin, and 7-(6-hydroxyhexyloxy)coumarin.

12. The process of claim 10, wherein the polyimide is one or more selected from the group consisting of poly(4,4'-(hexafluoroisopropylidene)diphthalic anhydride-3,5-diaminobenzoic acid), poly(pyromellitic dianhydride-3,5-diaminobenzoic acid), poly(1,2,3,4-cyclobutane tetracarboxylic acid-3,5-diaminobenzoic acid), poly(2,2-bis(3,4-dicarboxylphenyl)hexafluoropropane dianhydride-3,5-diaminobenzoic acid), poly(pyromellitic dianhydride-4,4'-oxydiamine), poly(pyromellitic dianhydride-2,2-bis[4-(4-aminophenoxy)phenyl]-hexafluoropropane), poly(pyromellitic dianhydride-2,2-bis(4-aminophenoxyphenyl)propane), poly(1,2,3,4-cyclobutane tetracarboxylic acid-4,4'-oxydiamine), poly(1,2,3,4-cyclobutane tetracarboxylic acid-2,2-bis[4-(4-aminophenoxy)phenyl]-hexafluoropropane), poly(1,2,3,4-cyclobutane tetracarboxylic acid-2,2-bis(4-aminophenoxyphenyl)propane), poly(2,2-bis(3,4-dicarboxylphenyl)hexafluoropropane dianhydride-4,4'-oxydiamine), poly(2,2-bis(3,4-dicarboxylphenyl)hexafluoropropane dianhydride-2,2-bis[4-(4-aminophenoxy)phenyl]-hexafluoropropane), and poly(2,2-bis(3,4-dicarboxylphenyl)hexafluoropropane dianhydride-2,2-bis(4-aminophenoxyphenyl)propane).

13. The process of claim 12, wherein the polyimide has a molecular weight from 10 to 300 kDa.

14. The process of claim 10, wherein the solvent is dimethylsulfoxide (DMSO).

15. The process of claim 10, further comprising adding a catalyst to the liquid mixture.

16. The process of claim 15, wherein the catalyst comprises thionyl chloride.

17. The process of claim 10, wherein the coumarin compound and polyimide are mixed at a weight ratio of from 0.3:2 to 1:2.

18. The process of claim 10, wherein the stirring continues for 3 to 5 hours under an environment of $N_2$ gas.

19. The process of claim 10, wherein the stirring is conducted at a temperature of 50 to 700° C.

20. A grafted polymer prepared by the process of claim 10.

21. The grafted polymer of claim 20, wherein the coumarin compound is grafted by a graft ratio of 30 to 100%.

22. A process for preparing a liquid crystal alignment layer, comprising:
dissolving the grafted polymer of claim 20 in a solvent to provide a polymer solution;
coating the solution onto a transparent plate; and
evaporating the solvent from the solution, thereby providing a liquid crystal alignment layer.

23. The process of claim 22, wherein the solvent comprises N-methyl-2-pyrrolidone.

24. The process of claim 23, wherein the concentration of the grafted polymer in the polymer solution is from 1 to 5% (w/w).

25. A liquid crystal alignment layer prepared by the process of claim 22.

* * * * *